United States Patent
Hasebe et al.

(10) Patent No.: US 6,467,286 B2
(45) Date of Patent: Oct. 22, 2002

(54) COOLING APPARATUS OF HYBRID VEHICLE, INCLUDING SERIALLY-CONNECTED COOLING SYSTEMS FOR ELECTRIC DEVICES WHICH HAVE DIFFERENT HEAT RESISTING ALLOWABLE TEMPERATURES

(75) Inventors: Tetsuya Hasebe; Yusuke Tatara; Toshinori Tsukamoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/017,296

(22) Filed: Dec. 18, 2001

(65) Prior Publication Data

US 2002/0073726 A1 Jun. 20, 2002

(30) Foreign Application Priority Data

Dec. 20, 2000 (JP) ........................ 2000-387356

(51) Int. Cl.[7] ............................ F25D 23/12; F25B 27/00
(52) U.S. Cl. .................... 62/185; 62/323.2; 165/41; 180/65.2
(58) Field of Search ................... 62/185, 244, 323.3; 165/41, 51; 180/65.1, 65.2

(56) References Cited

U.S. PATENT DOCUMENTS

| | | | | |
|---|---|---|---|---|
| 5,255,737 A | * | 10/1993 | Gentry et al. | 165/159 |
| 5,291,960 A | * | 3/1994 | Brandenburg et al. | 123/41.14 |
| 5,531,285 A | * | 7/1996 | Green | 123/142.5 E |
| 5,549,153 A | * | 8/1996 | Baruschke et al. | 165/42 |
| 5,678,760 A | * | 10/1997 | Muso et al. | 165/41 |
| 6,213,233 B1 | * | 4/2001 | Sonntag et al. | 123/142.5 R |
| 6,332,497 B1 | * | 12/2001 | Niwa et al. | 165/204 |
| 6,386,279 B1 | * | 5/2002 | Okabe et al. | 165/202 |

FOREIGN PATENT DOCUMENTS

JP      11-107748      4/1999

* cited by examiner

*Primary Examiner*—William E. Tapolcai
(74) *Attorney, Agent, or Firm*—Armstrong, Westerman & Hattori, LLP (57) ABSTRACT

A cooling apparatus which has a simple structure and which can efficiently cool a plurality of electric devices is disclosed. The apparatus comprises a cooling circuit including serially-connected cooling systems for cooling electric devices by circulating a refrigerant; a circulating pump for circulating the refrigerant through the cooling circuit; and a radiator which is serially connected to the cooling systems in the cooling circuit and has a refrigerant outlet from which a refrigerant is supplied. The serially-connected cooling systems are arranged in a manner such that heat resisting allowable temperatures, assigned to the electric devices which respectively correspond to the cooling systems, increase from the cooling system closest to the refrigerant outlet to the cooling system farthest from the refrigerant outlet in the cooling circuit, wherein each heat resisting allowable temperature is the maximum temperature at which the relevant electric device can operate.

13 Claims, 5 Drawing Sheets

COOLING APPARATUS OF HYBRID VEHICLE, INCLUDING SERIALLY-CONNECTED COOLING SYSTEMS FOR ELECTRIC DEVICES WHICH HAVE DIFFERENT HEAT RESISTING ALLOWABLE TEMPERATURES

BACKGROUND OF THE INVENTION

1. Field of the Invention

The present invention relates to cooling apparatuses for hybrid vehicles which are driven by an engine and a motor, and in particular, to a technique of performing a cooling operation based on heat resisting allowable temperatures assigned to various kinds of electric devices.

2. Description of the Related Art

In known cooling apparatuses, a plurality of cooling systems are each provided for a plurality of electric systems such as a motor, battery, inverters, and the like, which are built into a hybrid vehicle, and the cooling systems are arranged and connected in parallel. Japanese Unexamined Patent Application, First Publication No. Hei 11-107748 discloses an example of such an apparatus.

Additionally, in such a conventional cooling apparatus, the diameter of a pipe, through which a refrigerant flows, can be changed according to the heating value of each cooling system, and flow control valves for controlling the flow rate of each cooling system are provided. Therefore, a larger quantity of refrigerant flows through a cooling system which has a larger heating value.

However, since the plurality of electric devices are arranged in parallel, the piping arrangement for circulating the refrigerant is complicated.

Additionally, the operation of controlling a plurality of flow control valves is complicated. Furthermore, the flow rate of the refrigerant is changed by controlling the degree of opening of each flow control valve. Therefore, the circulating pump for circulating the refrigerant in the cooling circuit is always working, so that the power consumption of the battery system for supplying electric power to the circulating pump is unnecessarily increased.

SUMMARY OF THE INVENTION

In consideration of the above circumstances, an object of the present invention is to provide a cooling apparatus which has a simple structure and which can efficiently cool a plurality of electric devices.

Therefore, the present invention provides a cooling apparatus built into a hybrid vehicle, comprising:
- a cooling circuit (e.g., cooling circuit 10a in an embodiment explained below) including a plurality of serially-connected cooling systems (e.g., battery cooling system 14, PDU cooling system 15, D/V cooling system 16, first motor cooling system 17, and second motor cooling system 18 in the embodiment explained below) for cooling a plurality of electric devices by circulating a refrigerant, wherein the electric devices include at least a motor (e.g., first motor in the embodiment explained below) for driving the vehicle, a battery system, and an inverter (e.g., power drive unit PDU in the embodiment explained below) for supplying electric power to the motor;
- a circulating pump (e.g., refrigerant circulating pump 13 in the embodiment explained below) for circulating the refrigerant through the cooling circuit; and
- a radiator (e.g., electric device radiator 11 in the embodiment explained below) which is serially connected to the cooling systems in the cooling circuit and has a refrigerant outlet (e.g., refrigerant outlet 11a in the embodiment explained below) from which a refrigerant is supplied, wherein:
    - the serially-connected cooling systems are arranged in a manner such that heat resisting allowable temperatures, assigned to the electric devices which respectively correspond to the cooling systems, increase from the cooling system closest to the refrigerant outlet to the cooling system farthest from the refrigerant outlet in the cooling circuit, wherein each heat resisting allowable temperature is the maximum temperature at which the relevant electric device can operate.

According to the above structure, the plurality of the cooling systems for circulating and supplying the refrigerant to the electric devices which are built into the vehicle are serially connected via the radiator, so that the cooling circuit is formed. Therefore, the piping arrangement for circulating the refrigerant can be simplified.

In addition, the serially-connected cooling systems are arranged along a refrigerant circulating path in a manner such that the heat resisting allowable temperatures assigned to the electric devices increase in the order of arrangement of the electric devices. That is, the electric devices having higher priority are located at the upstream side of the cooling circuit so as to reliably cool these electric devices, while the electric devices having relatively lower priority are located at the downstream side of the cooling circuit. Therefore, the plurality of the electric devices can be efficiently cooled, thereby improving the fuel consumption of the vehicle.

The cooling apparatus may further comprise:
- an air-conditioner condenser (e.g., air-conditioner condenser 21 in the embodiment explained below) which is provided for an air conditioner of the vehicle and which faces the radiator; and
- a cooling fan (e.g., condenser cooling fan 19 in the embodiment explained below) which faces the air-conditioner condenser, wherein:
    - the radiator and the air-conditioner condenser are cooled by the cooling fan.

According to this structure, the air-conditioner condenser is located in a manner such that the air-conditioner condenser faces the radiator which is connected to the cooling circuit for cooling the electric devices (which include at least the motor, the battery system, and the inverter). The radiator and the air-conditioner condenser are cooled by the cooling fan which faces the air-conditioner condenser. Therefore, the radiator and the air-conditioner condenser can be efficiently cooled by the common cooling fan, thereby simplifying the structure of the apparatus.

The present invention also provides a cooling apparatus built into a hybrid vehicle, comprising:
- an engine radiator (e.g., engine radiator 12 in the embodiment explained below) connected to an engine cooling system (e.g., engine cooling system 12a in the embodiment explained below) which cools an engine by circulating a refrigerant, wherein the engine outputs a driving force of the vehicle;
- a radiator cooling fan (e.g., radiator cooling fan 20 in the embodiment explained below) which faces the engine radiator;
- a cooling circuit (e.g., cooling circuit 10a in the embodiment explained below) including a plurality of serially-connected cooling systems (e.g., battery cooling system 14, PDU cooling system 15, D/V cooling system 16, first motor cooling system 17, and second motor cooling system 18 in the embodiment explained below) for cooling a plurality of electric devices by circulating a refrigerant, wherein the electric devices include at least a motor (e.g., first motor M1 and second motor M2 in the embodiment explained below) for outputting driving force according to a driving state of the vehicle, a battery system, and an inverter (e.g., power drive unit PDU in the embodiment explained below) for supplying electric power to the motor;

a circulating pump (e.g., refrigerant circulating pump 13 in the embodiment explained below) for circulating the refrigerant through the cooling circuit; and an electric device radiator (e.g., electric device radiator 11 in the embodiment explained below) which is serially connected to the cooling systems in the cooling circuit and has a refrigerant outlet (e.g., refrigerant outlet 11*a* in the embodiment explained below) from which a refrigerant is supplied, wherein:

the serially-connected cooling systems are arranged in a manner such that heat resisting allowable temperatures, assigned to the electric devices which respectively correspond to the cooling systems, increase from the cooling system closest to the refrigerant outlet to the cooling system farthest from the refrigerant outlet in the cooling circuit, wherein each heat resisting allowable temperature is the maximum temperature at which the relevant electric device can operate.

The above structure comprises the electric device radiator which is connected to the cooling circuit for cooling the electric devices which include at least the motor, the battery system, and the inverter. This electric device radiator is independent of the system including the engine radiator. The cooling systems for circulating and supplying the refrigerant to the electric devices are serially connected via the electric device radiator, thereby simplifying the piping arrangement for circulating the refrigerant.

In addition, the serially-connected cooling systems are arranged along a refrigerant circulating path in a manner such that the heat resisting allowable temperatures assigned to the electric devices increase in the order of arrangement of the electric devices. That is, the electric devices having higher priority are located at the upstream side of the cooling circuit, while the electric devices having relatively lower priority are located at the downstream side of the cooling circuit. Therefore, the plurality of the electric devices can be efficiently cooled, thereby improving the fuel consumption of the vehicle.

Preferably, the electric device radiator faces the engine radiator. In this case, the electric device radiator, which is independent of the system including the engine radiator, can also be cooled by the radiator cooling fan which faces the engine radiator. Therefore, it is unnecessary to provide a dedicated cooling fan for the electric devices, thereby simplifying the structure of the apparatus and performing an efficient cooling operation.

The cooling apparatus may further comprise:

an air-conditioner condenser (e.g., air-conditioner condenser 21 in the embodiment explained below) which is provided for an air conditioner of the vehicle and which faces the engine radiator; and a condenser cooling fan (e.g., condenser cooling fan 19 in the embodiment explained below) which faces the air-conditioner condenser, wherein:

the electric device radiator faces the air-conditioner condenser.

According to this structure, the engine radiator and the electric device radiator can be efficiently cooled by the condenser cooling fan for cooling the air-conditioner condenser and the structure of the apparatus can be simplified.

Each cooling apparatus as explained above may further comprise:

a plurality of temperature sensors (e.g., refrigerant temperature sensor 22, battery temperature sensor 23, first temperature sensor 24, second temperature sensor 25, and first motor temperature sensor 26 in the embodiment explained below) for detecting temperatures of the electric devices, wherein:

a duty factor of the circulating pump, which is the rate of energizing the circulating pump, is changed according to detection signals output from the temperature sensors.

According to this structure, based on the detection signals output from the temperature sensors, values indicating the cooling performance required by the plurality of electric devices can be calculated, and the operation of the circulating pump for refrigerant (i.e., the speed of rotation of the pump) is controlled based on these required values. Therefore, in comparison with a control operation in which the circulating pump is always driven under fixed conditions, the circulating pump can be more efficiently driven and controlled. Accordingly, the power consumption of the circulating pump can be reduced and the fuel consumption of the vehicle can be improved.

The duty factor may be calculated for each detection signal output from each temperature sensor, so as to obtain a plurality of duty factors, and the circulating pump is driven based on the maximum value among these duty factors. In this case, the circulating pump is driven based on the maximum value among the values indicating the cooling performance (i.e., duty factors) required by the plurality of electric devices. Therefore, the electric devices can be reliably cooled and excessive cooling or the like can be prevented, thereby improving the fuel consumption of the vehicle.

The cooling apparatus may further comprise:

a refrigerant temperature sensor (e.g., refrigerant temperature sensor 22 in the embodiment explained below) for detecting the temperature of the refrigerant in the vicinity of the refrigerant outlet of the electric device radiator, wherein:

the radiator cooling fan is driven when the temperature of the refrigerant detected by the refrigerant temperature sensor is larger than a predetermined temperature.

According to this structure, in addition to the case in which the engine water temperature or the like is relatively high and a request for cooling the engine radiator is output in the control operation, even when such a request for cooling the engine radiator is not output, if the temperature of the refrigerant for the electric devices is larger than a predetermined temperature, then the radiator cooling fan is driven, thereby cooling the electric device radiator. Therefore, the electric device radiator can be reliably cooled.

The cooling apparatus may further comprise:

a refrigerant temperature sensor (e.g., refrigerant temperature sensor 22 in the embodiment explained below) for detecting the temperature of the refrigerant in the vicinity of the refrigerant outlet of the electric device radiator, wherein:

the condenser cooling fan is driven when the temperature of the refrigerant detected by the refrigerant temperature sensor is larger than a predetermined temperature.

According to this structure, in addition to the case in which the temperature of the air-conditioner condenser is relatively high and a request for cooling the air-conditioner condenser is output in the control operation, even when such a request for cooling the air-conditioner condenser is not output, if the temperature of the refrigerant for the electric devices is larger than a predetermined temperature, then the condenser cooling fan is driven, thereby cooling the electric device radiator. Therefore, the electric device radiator can be reliably cooled.

Typically, in the above cooling apparatuses:

the battery system, the inverter, and the motor are serially connected in this order, wherein the battery system is closest to the refrigerant outlet in the cooling circuit; and the heat resisting allowable temperatures, which are respectively assigned to the battery system, the inverter, and the motor, increase in this order.

Accordingly, the refrigerant is supplied to the battery system, the inverter, and the motor in this order, where the corresponding heat resisting allowable temperatures increase also in this order. Therefore, the electric devices can be suitably cooled, thereby improving the fuel consumption of the vehicle.

DESCRIPTION OF THE PREFERRED EMBODIMENTS

Hereinafter, an embodiment of the cooling apparatus for hybrid vehicles according to the present invention will be explained in detail with reference to the drawings.

Figure 1:
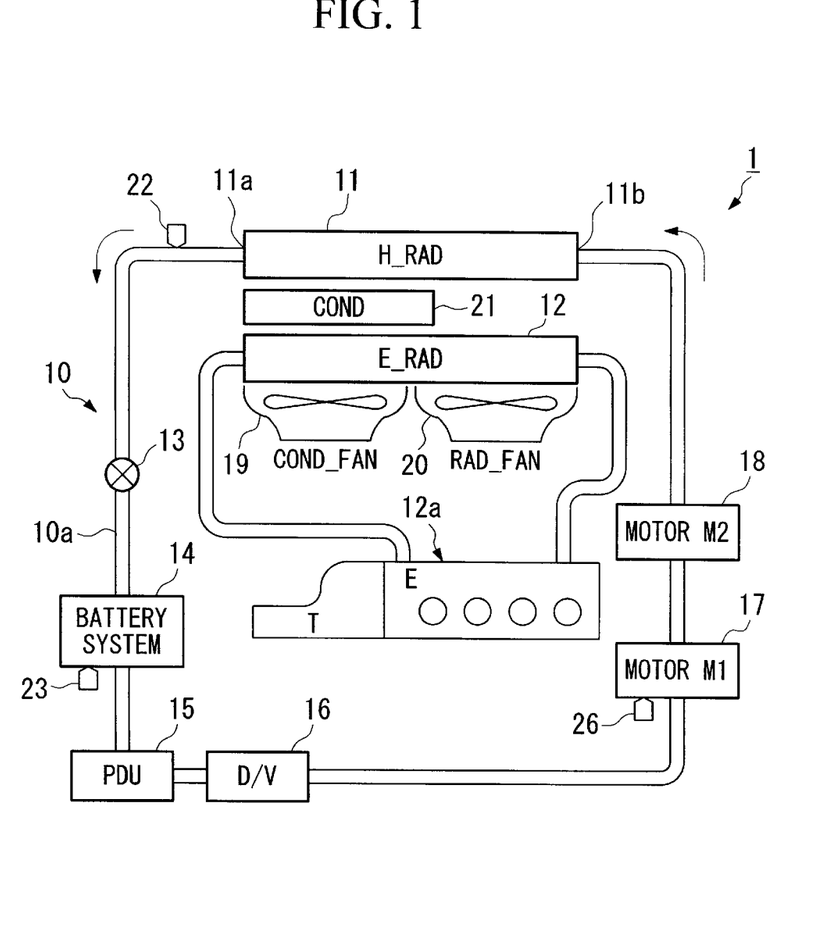
FIG. 1 is a diagram showing the structure of a cooling apparatus of a hybrid vehicle in an embodiment according to the present invention.
Figure 2:
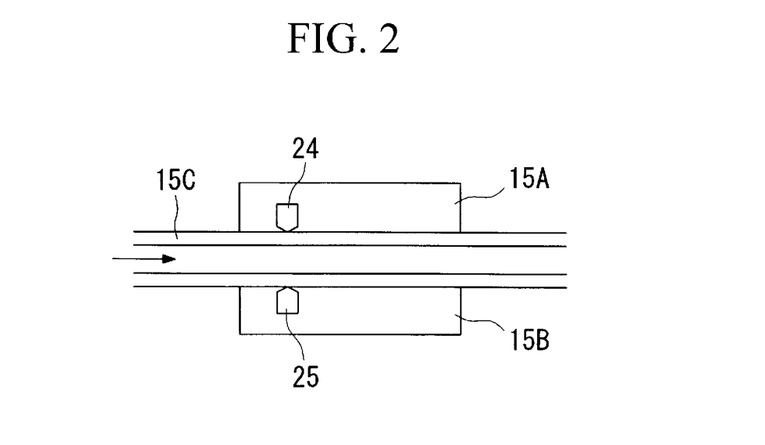
FIG. 2 is a diagram showing the structure of a PDU cooling system in FIG. 1.

FIG. 1 is a diagram showing the structure of a cooling apparatus 10 of a hybrid vehicle in the embodiment. FIG. 2 is a diagram showing the structure of a PDU cooling system 15 provided for a power drive unit PDU in FIG. 1.

This cooling apparatus 10 is built into a hybrid vehicle 1 in which driving power generated by an engine E and a first motor M1 (for driving) is transmitted to driving wheels via a transmission T. The transmission T employs an automatic or manual transmission. When the hybrid vehicle 1 is in a deceleration mode and the driving force is transmitted from the wheels to a second motor M2, the second motor M2 functions as a generator for generating a regenerative braking force, so that the kinetic energy of the vehicle body is stored as electric energy. Based on the driving state of the hybrid vehicle 1, the second motor M2 also generates an assisting driving force for assisting the driving force which is generated by the engine E and the first motor M1.

The driving of the first motor M1 and the regenerative operation and driving of the second motor M2 are executed by the power drive unit PDU to which a motor control apparatus (not shown) sends a control command. Electric power is supplied to the first motor M1 from the power drive unit PDU which functions as an inverter. More specifically, a battery system including a high-voltage battery and the like is connected to the power drive unit PDU, and electric energy is transmitted and received between the battery system and the first and second motors M1 and M2. The battery system also includes a 12-V auxiliary battery for driving various assisting devices included in the hybrid vehicle 1, and this auxiliary battery is connected to the high-voltage battery via a DC-DC converter D/V. The voltage of the high-voltage battery is stepped down by the DC-DC converter D/V, thereby charging the auxiliary battery. Here, predetermined heat resisting allowable temperature values, which are respectively assigned to a plurality of electric devices such as the battery system, the power drive unit PDU, the DC-DC converter D/V, the first motor M1, and the second motor M2, increase in this order of arrangement of these electric devices. That is, each heat resisting allowable temperature value is the maximum temperature at which the relevant electric device can operate.

The cooling system 10 of the hybrid vehicle of the present embodiment comprises an electric device radiator 11 provided for the electric devices, an engine radiator 12 which is provided for the engine and is connected to an engine cooling system 12a, a refrigerant circulating pump 13 for circulating the refrigerant, a plurality of cooling systems, each for cooling a specific electric device by circulating the refrigerant, a condenser cooling fan 19 for cooling a condenser and the like, a radiator cooling fan 20 for cooling radiators, and an air-conditioner condenser 21 provided for an air conditioner. The above cooling systems include a battery cooling system 14 for cooling the battery system, a PDU cooling system 15 for cooling the power drive unit PDU, a D/V cooling system 16 for cooling the DC-DC converter D/V, a first motor cooling system 17 for cooling the first motor M1, and a second motor cooling system 18 for cooling the second motor M2.

A cooling circuit 10a is formed from a refrigerant outlet 11a of the electric device radiator 11 via the circulating pump 13 to the cooling systems 14 to 18 which are serially connected. That is, the cooling systems 14 to 18 are arranged in a manner such, that the predetermined heat resisting allowable temperature values assigned to the electric devices (which respectively correspond to these cooling systems 14 to 18) increase in this order. That is, the electric device cooled by the cooling system 14 has the lowest heat resisting allowable temperature value.

Therefore, the refrigerant supplied from the electric device radiator 11 is drawn via the circulating pump 13 into the battery cooling system 14, the PDU cooling system 15, the D/V cooling system 16, the first motor cooling system 17, the second motor cooling system 18, and a refrigerant inlet 11b of the electric device radiator 11, thereby circulating the refrigerant.

The engine radiator 12 is connected to the engine cooling system 12a to form a system separated from the system which includes the electric device radiator 11. The air-conditioner condenser 21 is placed between the electric device radiator 11 and the engine radiator 12.

The condenser cooling fan 19 and the radiator cooling fan 20 are adjacent, and the engine radiator 12 faces these cooling fans. In addition, the condenser cooling fan 19 faces the air-conditioner condenser 21 with the engine radiator 12 therebetween. That is, the blown air from the condenser cooling fan 19 is supplied to the engine radiator 12, the air-conditioner condenser 21, and the electric device radiator 11 in turn, while the blown air from the radiator cooling fan 20 is supplied to the engine radiator 12 and the electric device radiator 11 in turn.

As shown in FIG. 2, in the structure of the PDU cooling system 15, a refrigerant passage 15C is located between a first switching section 15A and a second switching section 15B. The first switching section 15A typically comprises an IGBT (insulated gate bipolar transistor) and controls a switching operation for energizing the first motor M1 which is provided for driving the vehicle. The second switching section 15B also typically comprises an IGBT and controls a switching operation for energizing the second motor M2 which performs regeneration in a deceleration mode of the vehicle or generates a driving force according to the driving state of the vehicle.

The cooling systems 14 to 18 employ a plurality of temperature sensors, for example, a refrigerant temperature sensor 22 which is located in the vicinity of the refrigerant outlet 11a of the electric device radiator 11, a battery temperature sensor 23 for detecting the temperature of the battery system, a first temperature sensor 24 for detecting the temperature of the first switching section 15A, a second temperature sensor 25 for detecting the temperature of the second switching section 15B, and a first motor temperature sensor 26 for detecting the temperature of the first motor M1.

Below, the operation of the cooling apparatus 10 having the above-explained structure will be explained with reference to the drawings.

Figure 3:
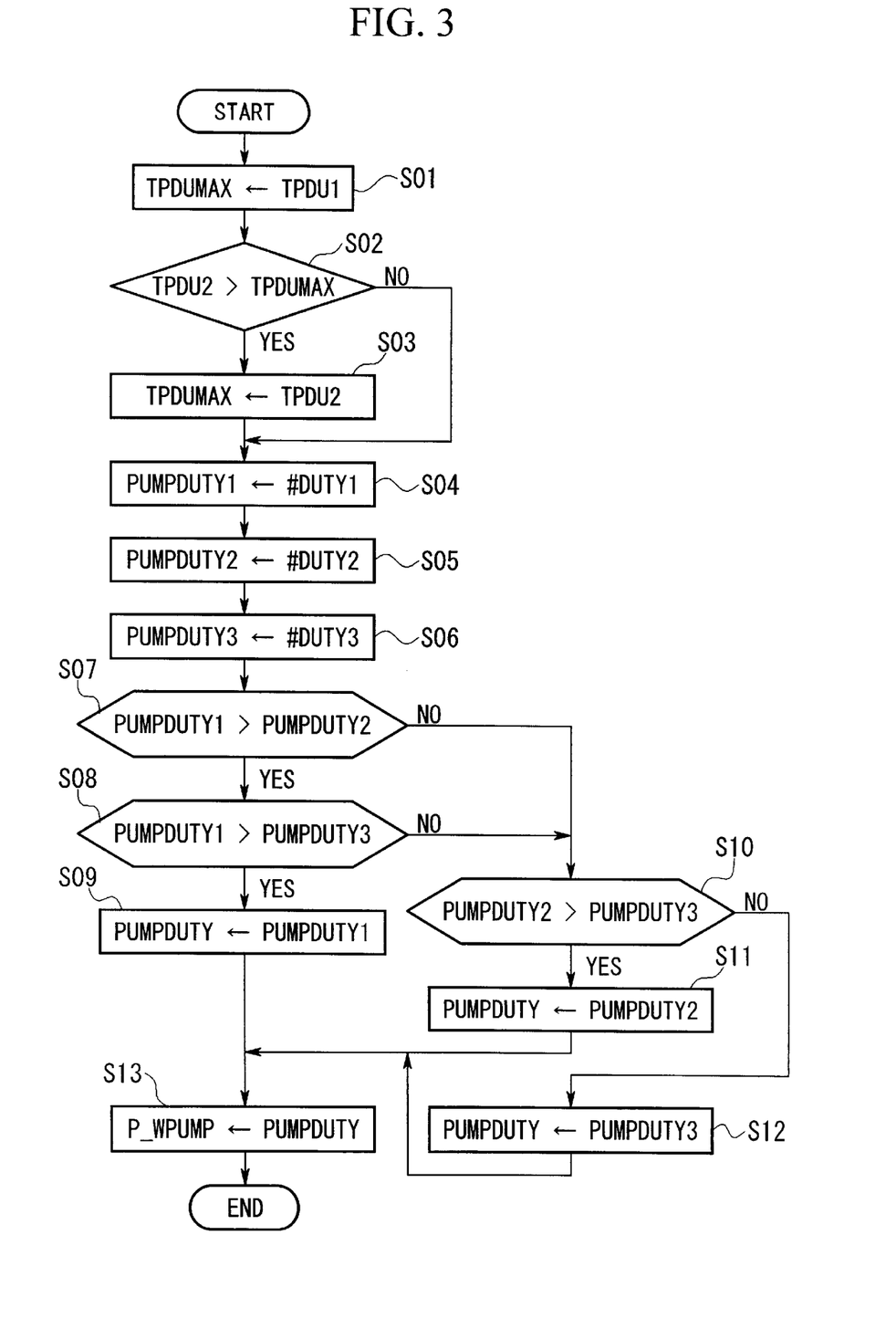
FIG. 3 is a flowchart showing the operation of the cooling apparatus for the hybrid vehicle, and specifically, the control operation of energizing the refrigerant circulating pump.
Figure 4:
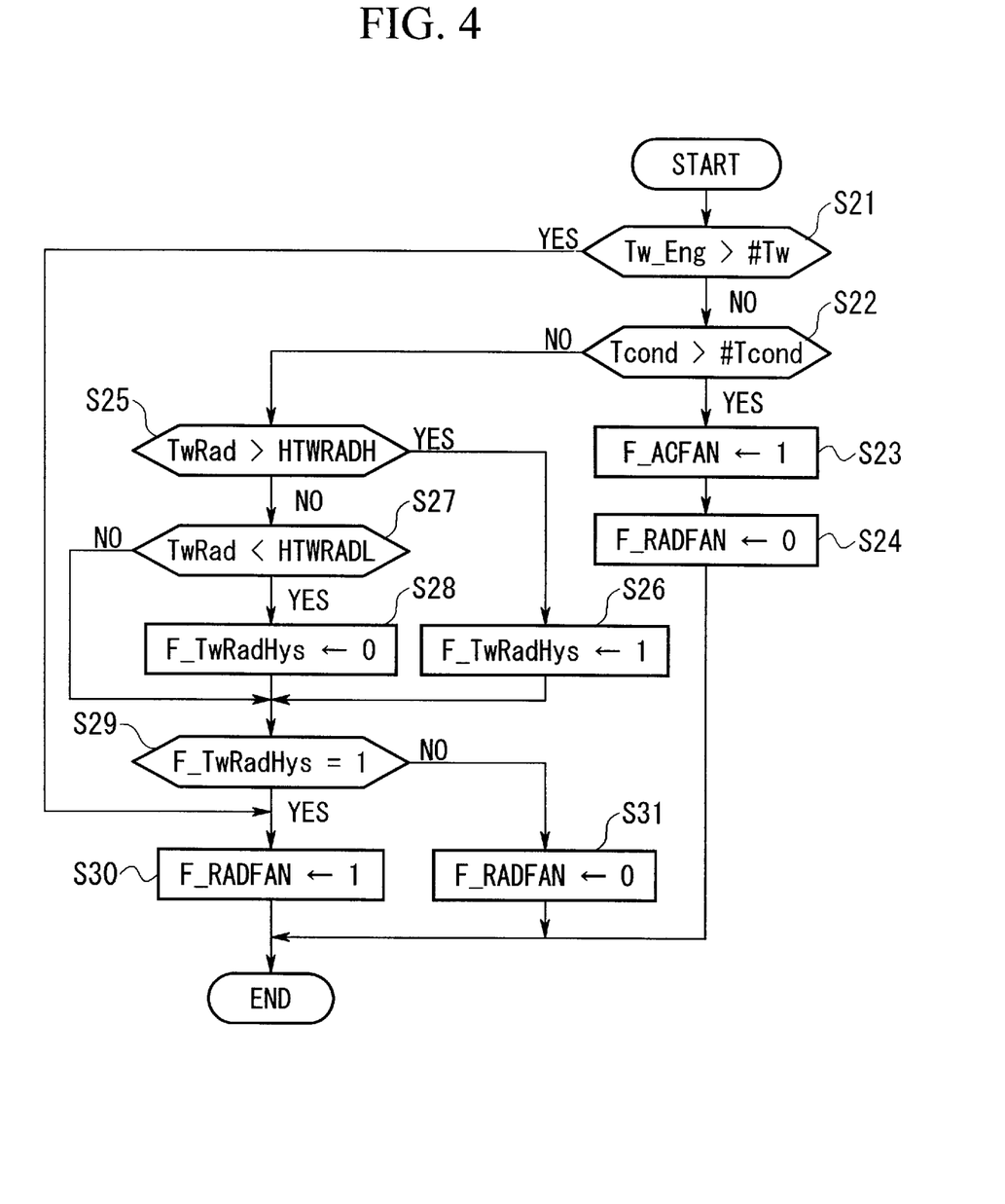
FIG. 4 is a flowchart showing the operation of the cooling apparatus for the hybrid vehicle, and specifically, the operation of controlling the cooling fan for the air conditioner and the radiator cooling fan.
Figure 5:
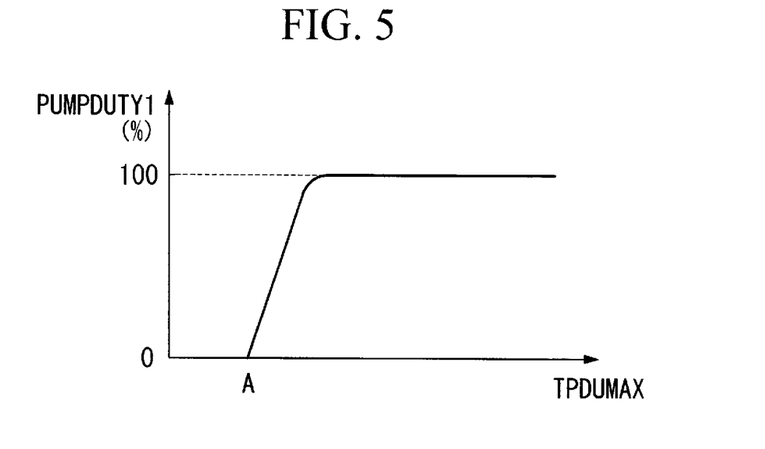
FIG. 5 is a graph showing changes in a duty value related to the refrigerant circulating pump versus the temperature of the power drive unit PDU.
Figure 6:
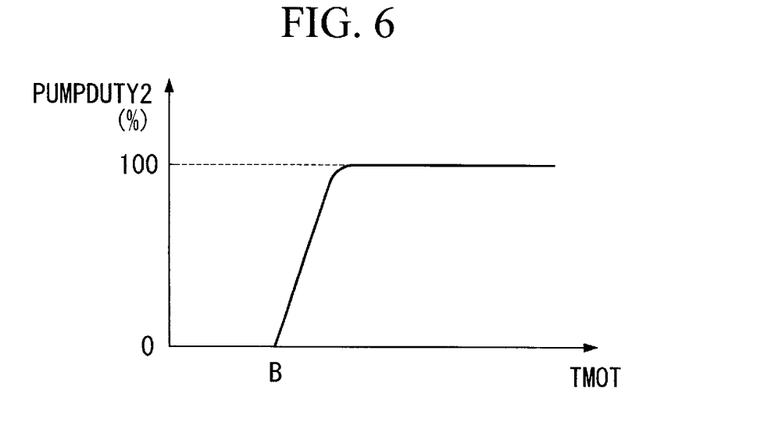
FIG. 6 is a graph showing changes in a duty value related to the refrigerant circulating pump versus the temperature of the first motor M1 provided for driving the vehicle.
Figure 7:
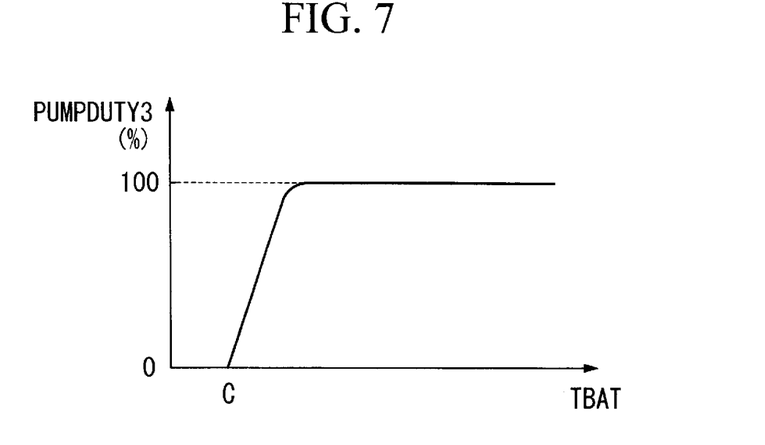
FIG. 7 is a graph showing changes in a duty value related to the refrigerant circulating pump versus the temperature of the battery system.
Figure 8:
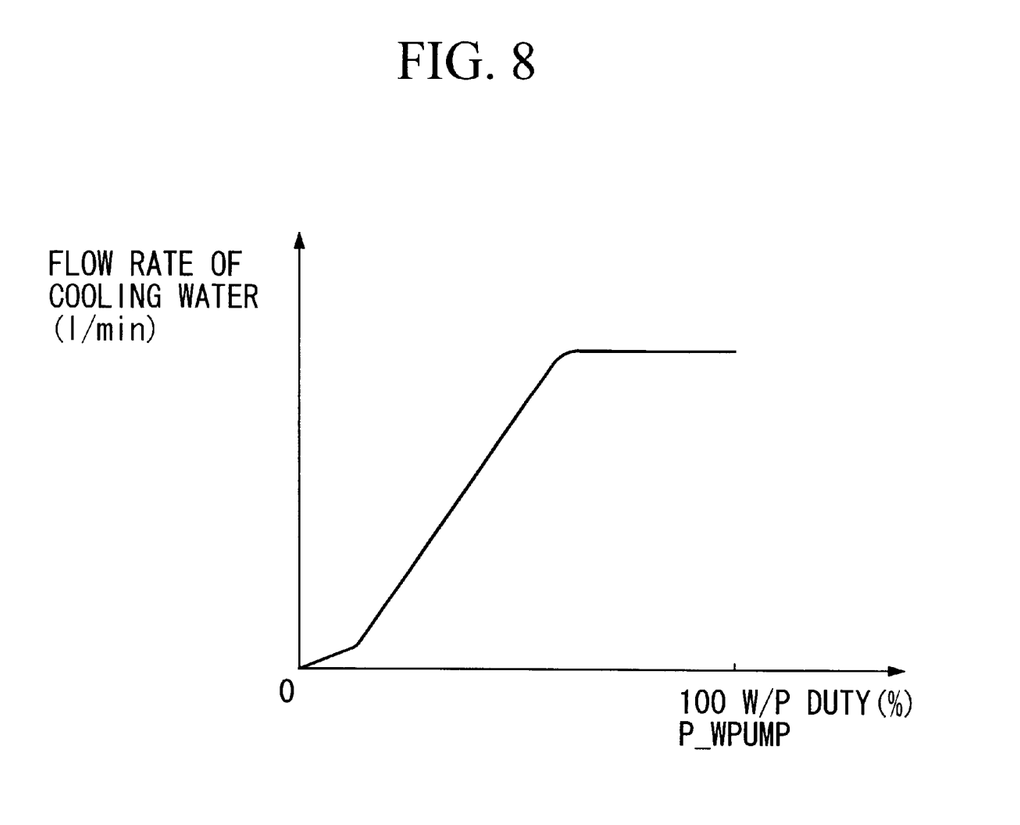
FIG. 8 is a graph showing changes in the flow rate of the refrigerant (i.e., cooling water) versus the duty value of the refrigerant circulating pump.

FIG. 3 is a flowchart showing the operation of the cooling apparatus 10 for the hybrid vehicle, and specifically, the control operation of energizing the refrigerant circulating pump 13. FIG. 4 is a flowchart showing the operation of the cooling apparatus 10 for the hybrid vehicle, and specifically, the operation of controlling the condenser cooling fan 19 and the radiator cooling fan 20. FIG. 5 is a graph showing changes in a duty value related to the refrigerant circulating pump 13 (vertical axis) versus the temperature of the power drive unit PDU (horizontal axis). FIG. 6 is a graph showing changes in a duty value related to the refrigerant circulating pump 13 (vertical axis) versus the temperature of the first motor M1 which is provided for driving the vehicle (horizontal axis). FIG. 7 is a graph showing changes in a duty value related to the refrigerant circulating pump 13 (vertical axis) versus the temperature of the battery system (horizontal axis). FIG. 8 is a graph showing changes in the flow rate of the refrigerant (i.e., cooling water) (vertical axis) versus the duty value of the refrigerant circulating pump 13 (horizontal axis).

In the first step S01 in FIG. 3, a PDU maximum temperature TPDUMAX, which is a parameter used in the operation, is set to a first PDU temperature TPDU1 which is a temperature value detected by the first temperature sensor 24.

In the second step S02, it is determined whether the PDU maximum temperature TPDUMAX is smaller than a second PDU temperature TPDU2 which is a temperature value detected by the second temperature sensor 25. If the result of the determination is "YES", the operation proceeds to step S03, while if the result of the determination is "NO", the operation proceeds to step S04.

In step S03, the PDU maximum temperature TPDUMAX is set to the second PDU temperature TPDU2 detected by the second temperature sensor 25.

In step S04, a specific data table is searched based on the PDU maximum temperature TPDUMAX (refer to FIG. 5 which shows the relationship of the data stored in such a table), so that a first duty value PUMPDUTY1, assigned to the refrigerant circulating pump 13, is set to a retrieved value #DUTY1 (i.e., the value retrieved from the data table).

In the following step S05, a specific data table is searched based on a first motor temperature TMOT, which is a temperature value detected by the first motor temperature sensor 26 (refer to FIG. 6 which shows the relationship of the data stored in such a table), so that a second duty value PUMPDUTY2, also assigned to the refrigerant circulating pump 13, is set to a retrieved value #DUTY2.

In the following step S06, a specific data table is searched based on a battery temperature TBAT, which is a temperature value detected by the battery temperature sensor 23 (refer to FIG. 7 which shows the relationship of the data stored in such a table), so that a third duty value PUMPDUTY3, also assigned to the refrigerant circulating pump 13, is set to a retrieved value #DUTY3.

In step S07, it is determined whether the first duty value PUMPDUTY1 is larger than the second duty value PUMPDUTY2. If the result of the determination is "YES", the operation proceeds to step S08, while if the result of the determination is "NO", the operation proceeds to step S10.

In step S08, it is determined whether the first duty value PUMPDUTY1 is larger than the third duty value PUMPDUTY3. If the result of the determination is "YES", the operation proceeds to step S09, while if the result of the determination is "NO", the operation proceeds to step S10.

In step S09, a duty value PUMPDUTY, which is a parameter assigned to the refrigerant circulating pump 13, is set to the first duty value PUMPDUTY1.

In step S10, it is determined whether the second duty value PUMPDUTY2 is larger than the third duty value PUMPDUTY3. If the result of the determination is "YES", the operation proceeds to step S11, while if the result of the determination is "NO", the operation proceeds to step S12.

In step S11, the duty value PUMPDUTY for the refrigerant circulating pump 13 is set to the second duty value PUMPDUTY2.

In step S12, the duty value PUMPDUTY for the refrigerant circulating pump 13 is set to the third duty value PUMPDUTY3.

In the next step S13, a duty command value P_WPUMP, which is a command value for defining a duty factor of the refrigerant circulating pump 13 (i.e., the rate of energizing the refrigerant circulating pump 13), is set to the duty value PUMPDUTY, and the process of the flow in FIG. 3 is completed.

That is, the duty value required of the refrigerant circulating pump 13 is retrieved based on the temperature values detected at specific positions in the cooling circuit 10a and in the specific cooling systems 14, 15, and 17. The maximum value among these retrieved duty values is then output to the refrigerant circulating pump 13 as a command value for the duty factor. The refrigerant is then made to flow at a flow rate corresponding to the duty value (refer to FIG. 8).

In the charts of FIGS. 5 to 7, reference symbols A, B, and C each indicate the temperature at which the duty value for the refrigerant circulating pump 13 is 0 (here, C<A<B). That is, priority is defined in the cooling operation such that the battery cooling system 14, the PDU cooling system 15, and the first motor cooling system 17 decrease in priority in this order.

Below, the operation of controlling the condenser cooling fan 19 and the radiator cooling fan 20 will be explained.

In the first step S21 in FIG. 4, it is determined whether an engine water temperature Tw_Eng is larger than a predetermined water temperature #Tw. If the result of the determination is "YES", the operation proceeds to step S30, while if the result of the determination is "NO", the operation proceeds to step S22.

In step S22, it is determined whether a temperature Tcond of the air-conditioner condenser 21 is larger than a predetermined temperature #Tcond. If the result of the determination is "YES", the operation proceeds to step S23, while if the result of the determination is "NO", the operation proceeds to step S25.

In step S23, the value of a flag F_ACFAN, which is provided for commanding the operation of the condenser cooling fan 19, is set to 1.

In the next step S24, the value of a flag F_RADFAN, which is provided for commanding the operation of the radiator cooling fan 20, is set to 0. The process of the flow in FIG. 4 is then completed.

In step S25, it is determined whether a refrigerant temperature TwRad detected by the refrigerant temperature sensor 22 (which is positioned in the vicinity of the refrigerant outlet 11a of the electric device radiator 11) is larger than a predetermined high threshold temperature HTWRADH. If the result of the determination is "YES", the operation proceeds to step S26, while if the result of the determination is "NO", the operation proceeds to step S27.

In step S26, the value of a flag $F_{13}$ TwRadHys, which is provided for commanding the operation of the electric device radiator 11, is set to 1. The operation then proceeds to step S29.

In step S27, it is determined whether the refrigerant temperature TwRad, detected by the refrigerant temperature sensor 22, is smaller than a predetermined low threshold temperature HTWRADL. If the result of the determination is "YES", the operation proceeds to step S28, while if the result of the determination is "NO", the operation proceeds to step S29.

In step S28, the value of the flag F_TwRadHys, which indicates whether the refrigerant temperature TwRad is larger than the predetermined threshold temperatures HTWRADH and HTWRADL (i.e., the threshold temperature has hysteresis), is set to 0.

In the following step S29, it is determined whether the value of the flag F_TwRadHys is 1. If the result of the determination is "YES", the operation proceeds to step S30, while if the result of the determination is "NO", the operation proceeds to step S31.

In step S30, the value of the flag F_RADFAN, which is used for commanding the operation of the radiator cooling fan 20, is set to 1, and the process of this flow is completed. Conversely, in step S31, the value of the flag F_RADFAN is set to 0, and the process of this flow is completed.

That is, when the engine water temperature Tw_Eng is higher than the predetermined water temperature #Tw, the radiator cooling fan 20 is operated. Even when the engine water temperature Tw_Eng is equal to or less than the predetermined water temperature #Tw and the temperature Tcond of the air-conditioner condenser 21 is equal to or less than the predetermined temperature #Tcond, if the refrigerant temperature TwRad is higher than a predetermined threshold value, the radiator cooling fan 20 is also operated.

In addition, the condenser cooling fan 19 may be driven when the temperature of the refrigerant detected by the refrigerant temperature sensor 22 is larger than a predetermined temperature.

According to the cooling apparatus 10 of the hybrid vehicle in the present embodiment, the cooling systems 14 to 18 built into the hybrid vehicle 1 are serially arranged and connected to the refrigerant outlet 11a of the electric device radiator 11, so that the cooling circuit 10a is formed. Therefore, the structure of the cooling circuit 10a for circulating the refrigerant can be simplified.

In addition, the cooling systems 14 to 18 are placed in order from the upstream side to the downstream side along the passage of the circulated refrigerant, in a manner such that heat resisting allowable temperatures respectively assigned to the electric devices which respectively correspond to the cooling systems 14 to 18 increase in this order (i.e., the electric device cooled by the cooling system 14 has the lowest heat-resisting allowable temperature). Accordingly, a plurality of electric devices can be efficiently cooled, thereby improving the fuel consumption of the vehicle.

In addition, the electric device radiator 11 can be cooled using the radiator cooling fan 20 which faces the engine radiator 12, and the engine radiator 12 and the electric device radiator 11 can be cooled using the condenser cooling fan 19 which cools the air-conditioner condenser 21. Therefore, the structure of the cooling apparatus can be simplified and an efficient cooling operation can be performed.

Furthermore, values indicating the cooling performance required by the plurality of electric devices can be calculated based on the detection signals output from the plurality of temperature sensors 22 to 26, and the operation of the refrigerant circulating pump 13 is controlled based on these required values. Therefore, in comparison with a control operation in which the refrigerant circulating pump is always driven under fixed conditions, the refrigerant circulating pump 13 can be more efficiently driven and controlled. Accordingly, the power consumption of the refrigerant circulating pump 13 can be reduced and the fuel consumption of the vehicle can be improved.

In the present embodiment, the air-conditioner condenser 21 is located between the electric device radiator 11 and the engine radiator 12. However, the present invention is not limited to this arrangement, and the order of arranging the electric device radiator 11, the engine radiator 12, and the air-conditioner condenser 21 can be flexibly determined if the following conditions are satisfied. The conditions relate to the adjacent condenser cooling fan 19 and the radiator cooling fan 20 and are such that the blown air from the condenser cooling fan 19 is supplied to the engine radiator 12, the air-conditioner condenser 21, and the electric device radiator 11, while the blown air from the radiator cooling fan 20 is supplied to the engine radiator 12 and the electric device radiator 11.

What is claimed is:

1. A cooling apparatus built into a hybrid vehicle, comprising:
   a cooling circuit including a plurality of serially-connected cooling systems for cooling a plurality of electric devices by circulating a refrigerant, wherein the electric devices include at least a motor for driving the vehicle, a battery system, and an inverter for supplying electric power to the motor;
   a circulating pump for circulating the refrigerant through the cooling circuit; and
   a radiator which is serially connected to the cooling systems in the cooling circuit and has a refrigerant outlet from which a refrigerant is supplied, wherein:
      the serially-connected cooling systems are arranged in a manner such that heat resisting allowable temperatures, assigned to the electric devices which respectively correspond to the cooling systems, increase from the cooling system closest to the refrigerant outlet to the cooling system farthest from the refrigerant outlet in the cooling circuit, wherein each heat resisting allowable temperature is the maximum temperature at which the relevant electric device can operate.

2. A cooling apparatus as claimed in claim 1, further comprising:
   an air-conditioner condenser which is provided for an air conditioner of the vehicle and which faces the radiator; and
   a cooling fan which faces the air-conditioner condenser, wherein:
      the radiator and the air-conditioner condenser are cooled by the cooling fan.

3. A cooling apparatus as claimed in claim 1, further comprising:
   a plurality of temperature sensors for detecting temperatures of the electric devices, wherein:
      a duty factor of the circulating pump, which is the rate of energizing the circulating pump, is changed according to detection signals output from the temperature sensors.

4. A cooling apparatus as claimed in claim 3, wherein the duty factor is calculated for each detection signal output from each temperature sensor, so as to obtain a plurality of duty factors, and the circulating pump is driven based on the maximum value among these duty factors.

5. A cooling apparatus as claimed in claim 1, wherein:
   the battery system, the inverter, and the motor are serially connected in this order, wherein the battery system is closest to the refrigerant outlet in the cooling circuit; and
   the heat resisting allowable temperatures, which are respectively assigned to the battery system, the inverter, and the motor, increase in this order.

6. A cooling apparatus built into a hybrid vehicle, comprising:
   an engine radiator connected to an engine cooling system which cools an engine by circulating a refrigerant, wherein the engine outputs a driving force of the vehicle;
   a radiator cooling fan which faces the engine radiator;
   a cooling circuit including a plurality of serially-connected cooling systems for cooling a plurality of electric devices by circulating a refrigerant, wherein the electric devices include at least a motor for outputting driving force according to a driving state of the vehicle, a battery system, and an inverter for supplying electric power to the motor;
   a circulating pump for circulating the refrigerant through the cooling circuit; and
   an electric device radiator which is serially connected to the cooling systems in the cooling circuit and has a refrigerant outlet from which a refrigerant is supplied, wherein:
      the serially-connected cooling systems are arranged in a manner such that heat resisting allowable temperatures, assigned to the electric devices which respectively correspond to the cooling systems, increase from the cooling system closest to the refrigerant outlet to the cooling system farthest from the refrigerant outlet in the cooling circuit, wherein each heat resisting allowable temperature is the maximum temperature at which the relevant electric device can operate.

7. A cooling apparatus as claimed in claim 6, wherein the electric device radiator faces the engine radiator.

8. A cooling apparatus as claimed in claim 6, further comprising:
   an air-conditioner condenser which is provided for an air conditioner of the vehicle and which faces the engine radiator; and
   a condenser cooling fan which faces the air-conditioner condenser, wherein:
      the electric device radiator faces the air-conditioner condenser.

9. A cooling apparatus as claimed in claim 6, further comprising:
   a plurality of temperature sensors for detecting temperatures of the electric devices, wherein:
      a duty factor of the circulating pump, which is the rate of energizing the circulating pump, is changed according to detection signals output from the temperature sensors.

10. A cooling apparatus as claimed in claim 9, wherein the duty factor is calculated for each detection signal output from each temperature sensor, so as to obtain a plurality of duty factors, and the circulating pump is driven based on the maximum value among these duty factors.

11. A cooling apparatus as claimed in claim 6, further comprising:
    a refrigerant temperature sensor for detecting the temperature of the refrigerant in the vicinity of the refrigerant outlet of the electric device radiator, wherein:
       the radiator cooling fan is driven when the temperature of the refrigerant detected by the refrigerant temperature sensor is larger than a predetermined temperature.

12. A cooling apparatus as claimed in claim 8, further comprising:
    a refrigerant temperature sensor for detecting the temperature of the refrigerant in the vicinity of the refrigerant outlet of the electric device radiator, wherein:
       the condenser cooling fan is driven when the temperature of the refrigerant detected by the refrigerant temperature sensor is larger than a predetermined temperature.

13. A cooling apparatus as claimed in claim 6, wherein:
    the battery system, the inverter, and the motor are serially connected in this order, wherein the battery system is closest to the refrigerant outlet in the cooling circuit; and
    the heat resisting allowable temperatures, which are respectively assigned to the battery system, the inverter, and the motor, increase in this order.

* * * * *